(12) United States Patent  (10) Patent No.: US 7,101,047 B2
Florence et al.  (45) Date of Patent: Sep. 5, 2006

(54) PROJECTION DISPLAY SYSTEMS FOR LIGHT VALVES

(75) Inventors: James M. Florence, Beaverton, OR (US); Jeffrey B. Sampsell, Vancouver, WA (US); Austin L. Huang, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 13 days.

(21) Appl. No.: 11/044,820

(22) Filed: Jan. 26, 2005

(65) Prior Publication Data

US 2005/0157265 A1   Jul. 21, 2005

Related U.S. Application Data

(62) Division of application No. 09/539,918, filed on Mar. 31, 2000.

(51) Int. Cl.
*G03B 21/14* (2006.01)

(52) U.S. Cl. .............................. 353/20; 353/34; 349/9

(58) Field of Classification Search ................ 353/20, 353/31, 33, 34, 37; 349/5, 7, 8, 9
See application file for complete search history.

(56) References Cited

U.S. PATENT DOCUMENTS

| | | | |
|---|---|---|---|
| 4,124,278 A | 11/1978 | Grinberg et al. |
| 4,647,966 A | 3/1987 | Phillips et al. |
| 4,650,282 A | 3/1987 | Lo |
| 4,687,301 A | 8/1987 | Ledebuhr |
| 4,836,649 A | 6/1989 | Ledebuhr et al. |
| 4,850,685 A | 7/1989 | Kamakura et al. |
| 5,115,305 A | 5/1992 | Bauer et al. |
| 5,172,254 A | 12/1992 | Atarashi et al. |
| 5,517,340 A | 5/1996 | Doany et al. |
| 5,534,949 A | 7/1996 | Baron |
| 5,552,840 A | 9/1996 | Ishii et al. |
| 5,565,933 A | 10/1996 | Reinsch |
| 5,612,753 A | 3/1997 | Poradish et al. |
| 5,621,486 A | 4/1997 | Doany et al. |
| 5,648,860 A | 7/1997 | Ooi et al. |
| 5,658,060 A | 8/1997 | Dove |
| 5,668,572 A | 9/1997 | Meyer et al. |
| 5,680,180 A | 10/1997 | Huang |
| 5,751,384 A | 5/1998 | Sharp |
| 5,798,819 A | 8/1998 | Hattori et al. |
| 5,822,021 A | 10/1998 | Johnson et al. |
| 5,892,559 A | 4/1999 | Sharp |
| 5,918,961 A | 7/1999 | Ueda |
| 5,929,948 A | 7/1999 | Sharp et al. |
| 5,953,083 A | 9/1999 | Sharp |
| 5,990,996 A | 11/1999 | Sharp |
| 5,999,240 A | 12/1999 | Sharp et al. |
| 6,000,802 A | 12/1999 | Hashizume et al. |
| 6,049,367 A | 4/2000 | Sharp et al. |
| 6,078,374 A | 6/2000 | Sharp et al. |
| 6,089,718 A | 7/2000 | Hashizume |

(Continued)

FOREIGN PATENT DOCUMENTS

JP   03-046692   2/1991

(Continued)

*Primary Examiner*—William C. Dowling
(74) *Attorney, Agent, or Firm*—Chernoff, Vilhauer, McClung & Stenzel

(57) ABSTRACT

Projection display systems for light valves such as liquid crystal display panels, and in particular to the use of color component rotators, such as retardation filters, to provide for improved projection display architectures.

6 Claims, 7 Drawing Sheets

U.S. PATENT DOCUMENTS

| | | | |
|---|---|---|---|
| 6,113,239 A * | 9/2000 | Sampsell et al. | 353/31 |
| 6,141,071 A | 10/2000 | Sharp | |
| 6,142,633 A | 11/2000 | Takahara et al. | |
| 6,172,722 B1 | 1/2001 | Sharp | |
| 6,183,091 B1 * | 2/2001 | Johnson et al. | 353/20 |
| 6,252,638 B1 | 6/2001 | Johnson et al. | |
| 6,273,567 B1 * | 8/2001 | Conner et al. | 353/20 |
| 6,273,571 B1 | 8/2001 | Sharp et al. | |
| 6,304,302 B1 | 10/2001 | Huang et al. | |
| 6,309,071 B1 * | 10/2001 | Huang et al. | 353/31 |
| 6,343,864 B1 * | 2/2002 | Tajiri | 353/20 |
| 6,375,330 B1 * | 4/2002 | Mihalakis | 353/31 |
| 6,380,997 B1 | 4/2002 | Johnson et al. | |
| 6,417,892 B1 | 7/2002 | Sharp et al. | |
| 6,419,362 B1 * | 7/2002 | Ikeda et al. | 353/20 |
| 6,452,646 B1 | 9/2002 | Sharp et al. | |
| 6,490,087 B1 * | 12/2002 | Fulkerson et al. | 359/487 |
| 6,550,919 B1 * | 4/2003 | Heine | 353/31 |
| 6,636,276 B1 * | 10/2003 | Rosenbluth | 349/8 |
| 2002/0101546 A1 | 8/2002 | Sharp et al. | |
| 2002/0171793 A1 | 11/2002 | Sharp et al. | |

FOREIGN PATENT DOCUMENTS

| | | |
|---|---|---|
| JP | 03-202846 | 9/1991 |
| JP | 4050432 | 2/1992 |
| JP | 07-218909 | 8/1995 |
| JP | 10-186548 | 7/1998 |
| JP | 11-271893 | 10/1999 |
| JP | 11-305189 | 11/1999 |
| JP | 11-326861 | 11/1999 |
| JP | 2000-019326 | 1/2000 |
| JP | 2000-019455 | 1/2000 |
| JP | 2000-147656 | 5/2000 |
| JP | 2000-180792 | 6/2000 |
| JP | 2000-267046 | 9/2000 |

* cited by examiner

PROJECTION DISPLAY SYSTEMS FOR LIGHT VALVES

CROSS-REFERENCE TO RELATED APPLICATIONS

This application is a divisional application of U.S. patent application Ser. No. 09/539,918, filed Mar. 31, 2000, to which it claims priority.

BACKGROUND OF THE INVENTION

The present invention relates to projection display systems for light valves such as liquid crystal display panels, and in particular to the use of color component rotators, such as retardation filters, to provide for improved projection display architectures.

Projection systems for reflective liquid crystal displays (LCDs) are generally characterized by their complexity and large size relative to the systems implemented for transmissive LCDs. FIG. 1A discloses a prior art configuration for a transmissive LCD projector, while FIG. 1B shows a prior art reflective LCD projector for comparison. Dichroic filters DF1 and DF2 separate the red, green, and blue color components. The reflective LCDs require a polarizing beamsplitter (PBS) to be placed in front of each LCD in order to reflect light toward the reflective LCD, and then to transmit the modulated light. These components add complexity to the system and require the use of a larger distribution and recombination optical system to divide the light into the three color channels (i.e. the optical paths traveled by the three color components such as red, green, and blue).

An alternative system for reflective LCDs divides the illumination into the three color channels and recombines the output distributions into a smaller and less complex system. The basic configuration is shown in FIG. 2. However, the illumination input to this system must have a very specific distribution of color components and polarizations in which two of the color components (green and blue) are polarized in one direction, and the other color component (red) is polarized orthogonally to the other two. In order to produce that combination of color components and polarizations, a complicated prefiltering system is needed.

One such system is shown in FIG. 2, and indicates that considerable complexity is added back to the system in order to implement the prefiltering. In the system shown in FIG. 2, only one-half of the light is used, since the unwanted polarization state of each color component is simply discarded. In order to increase brightness of the system, a more complex prefiltering system is required that recycles the polarized light.

Various architectures have been proposed for projection display systems. Ledebuhr, U.S. Pat. No. 4,687,301, and Ledebuhr, U.S. Pat. No. 4,836,649, both describe projection systems for liquid crystal light valve (LCLV). The LCLV is an optically addressed reflective LC modulator and the systems described in these patents show optics to split a light source into separate colors paths and then individually illuminate and project the three LCLV devices. Both of these systems use only one-half of the illumination light since the unwanted polarization state is initially discarded. Ledebuhr, U.S. Pat. No. 4,687,301, uses a complicated color separating system to direct the color components to the LCLVs. Ledebuhr, U.S. Pat. No. 4,836,649 uses simpler but more numerous elements resulting in a large projection system.

Doany, et al. U.S. Pat. No. 5,621,486, and Dove, U.S. Pat. No. 5,658,060, both describe architectures that use Philips type prisms to control the three separate color channels. Doany, et al. U.S. Pat. No. 5,621,486, uses a single PBS prism to control the light into and out of all three LCIs) and a Philips prism to both split up and recombine the color channels. This arrangement appears simple, but the control of color in a Philips prism for p-polarization on the input and s-polarization on the output is extremely difficult, and no successful implementation of this type of system exists. Dove, U.S. Pat. No. 5,658,060, places a P13S prism in front of each LCD and uses the Philips prism only to recombine the color channels. This requires a second optical arrangement to split up the color distributions and leads to a larger, more complicated system overall.

Ooi et al., U.S. Pat. No. 5,648,860, uses an offset illumination and projection scheme. The system does not use a PBS prism, but instead relies on the offset to separate the input and output light distributions. The color splitting and recombination is accomplished by tilted dichroics that perform essentially the same as the dichroics in a Philips prism, with the same polarization related problems.

Hattori et al., U.S. Pat. No. 5,798,819, and Ueda, U.S. Pat. No. 5,918,961, both describe minor variations of the typical reflective LCD projector of FIG. 1B. These systems use a crossed dichroic prism to recombine light from the three LCDs and a separate crossed dichroic arrangement to perform the color splitting from the illumination system.

Sharp, U.S. Pat. No. 5,751,384, describes techniques for making waveband-specific retardation filters. This patent also describes a single panel LCD projector using the retardation filters in an active color shutter to gate the three colors onto the LCD for color field sequential projection.

Nevertheless, there remains a need for a bright projection display system, preferably for reflective LCD panels that utilize a small architecture. What is therefore desired is a projection display that is as small as or smaller than conventional projection displays, is capable of utilizing reflective LCD panels, uses readily available optical elements that perform well, uses conventional polarization converters, and provides good contrast without sacrificing brightness.

BRIEF SUMMARY OF THE INVENTION

The present invention overcomes the drawbacks of the prior art by providing in a first aspect of the invention a projection display system having a light source, a polarization converter, at least one polarizing beamsplitter, at least one liquid crystal display panel for generating an image, a projection source for projecting the image, and a color component rotator located between the polarization converter and the projection source.

In a second separate aspect of the invention, a projection display system has a light source, a polarization converter, at least two polarizing beamsplitters, at least three liquid crystal display panels, each for generating a respective image, a projection source for projecting the images, and at least two color component rotators, each of the color component rotators located between the polarization converter and the projection source.

In a third separate aspect of the invention, a method of displaying an image is provided. First, light comprised of at least a first, second, and third color component is provided. The light is converted to polarized light having a single polarization state. The first color component is separated from the second and third color components. The polarization state of the second color component is changed relative to the third color component. The second color component is separated from the third color component. Respective images are generated from each of the three color components. The images are then combined and projected.

The various aspects of the present invention each have one or more of the following advantages. The systems achieve their advantages through the use of color component rotators, or wavelength-specific retardation filters, located within the optical systems to control the polarization orientation of one of the color components in the system relative to the other two. The use of a color component rotator allows the polarization orientation of the three color components to be controlled within the main color distribution and recombination portion of the system rather than in a prefiltering system included within the illumination optics. This allows the use of conventional polarization converters rather than complicated prefiltering systems.

In addition, the use of color component rotators enables smaller distribution and recombination systems than conventional reflective projection display systems and, in one case, smaller even than typical transmissive projection display systems. Thus, the projection display systems and methods of the present invention reduce the overall projection display system size and complexity. The systems provide these advantages while achieving good contrast and without sacrificing brightness.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 3:
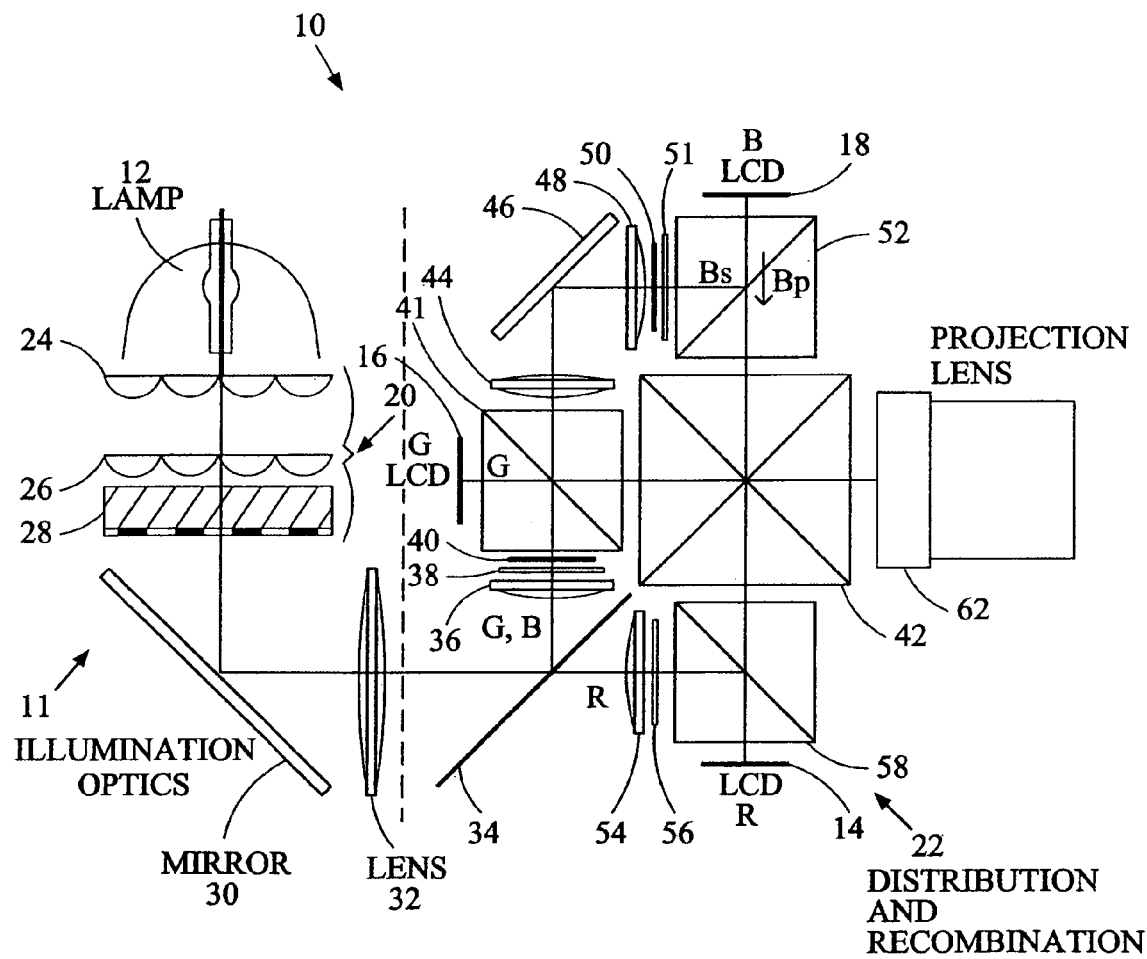
FIG. 3 is a schematic diagram of one embodiment of a projection display system of the present invention.

Referring now to the figures, wherein like numerals refer to like elements, FIG. 3 shows an exemplary projection display 10 having an illumination portion 11 and distribution and recombination portion 22. Distribution and recombination portion 22 includes three reflective liquid crystal display (LCD) panels 14, 16, and 18, also referred to as liquid crystal light valves.

Illumination portion 11 includes a light source 12 for producing white light, which may be separated into different color components of different bandwidths, such as a red color component, blue color component, and green color component. The white light from light source 12 passes through a polarization converter shown generally at 20. Polarization converter 20 may take the form of any conventional polarization converter, so that the randomly polarized light from light source 12 is converted into a single polarization state. In the embodiment shown in FIG. 3, the polarization converter 20 converts the white light from randomly polarized light into light that is polarized in the S direction. Polarization converter 20 is a conventional polarization converter structure comprised of fly's-eye lens plates 24, 26 and polarization converter prism array 28. Other polarization converters may also be used. While not preferred, the present invention could be used with a polarizing filter to produce uniformly polarized light; however, only half the light from light source 12 would be used. The polarized light is directed from the polarization converter 20 toward a mirror 30, which reflects the light through a lens 32.

The now S-polarized light exits the illumination portion 11 of the display 10 and enters the distribution and recombination portion 22. The white light encounters dichroic filter 34, which separates the red color component from the blue and green color components. In general, dichroic filters transmit light of a certain bandwidth, and reflect light of another band width. In display 10, dichroic filter 34 transmits the red color component while reflecting the blue and green color components.

Referring now to the blue and green channels, after reflecting from dichroic filter 34 the blue and green light components pass through a field lens 36, which in combination with other elements controls the size of the light projected on the LCD panel. The blue and green color components then pass through a polarizer 38 that transmits only S-polarized light. The polarizer 38 improves contrast by filtering out P-polarized light that otherwise may leak through to the LCD panels 16 and 18.

The blue and green color components then pass through a selective color component rotator 40, which rotates one of the color components (e.g., the blue color component) from one polarization state (e.g., the S-polarization state) to another polarization state (e.g., the P-polarization state). The color component rotator is a waveband specific retardation filter. It is a specially designed stack of retardation films in which the amount of retardation imparted to different wavebands can be selectively controlled by the orientation and number of retardation films used. The details of the design and operation of such color component rotators are described in Sharp, U.S. Pat. No. 5,751,384. A retardation filter can be made to act like a half waveplate for one bandwidth of light while leaving light of all other colors or bandwidths unaffected. Such color component rotators may be obtained from Color Link in Boulder, Colo., or Cambridge Research & Instrumentation in Cambridge, Mass. In the projection display 10, color component rotator 40 acts as a half waveplate for the blue color component, thus rotating the blue color component 90°, but leaving the green color component unaffected. Accordingly, the color component rotator 40 rotates the blue color component from the S to P-polarization state, while the green color component remains in the S-polarization state.

The blue and green color components then enter a polarizing beamsplitter 41 having different polarization states (e.g., S and P, respectively). The polarizing beamsplitter reflects the S-polarized green color component while transmitting the P-polarized blue color component. The green color component reflecting off the polarizing beamsplitter 41 is imaged using green LCD panel 16. The green image reflected by the modulated LCD panel 16 is in the P-polarization state and is transmitted through polarizing beamsplitter 41 and into the crossed dichroic prism 42.

Returning to the blue channel, the blue color component transmitted through the polarizing beamsplitter 41 is transmitted through relay lens 44, reflected off mirror 46 and transmitted through a second relay lens 48. The blue color component passes through another selective color component rotator 50, which rotates the polarization of the blue color component back to the S-polarization state. The now S-polarized blue color component then passes through a polarizer 51 which transmits S-polarized light. The S-polarized blue color component then enters a third polarizing beamsplitter 52, which reflects the S-polarized blue color component onto the blue LCD panel 18. The blue image reflected by blue LCD panel 18 is in the P-polarization state and is transmitted through polarizing beamsplitter 52 into the crossed dichroic prism 42. The relay lenses 44 and 48 are used to compensate for the longer path length of the blue channel relative to the green and red channels.

Returning to the red channel, the red color component is transmitted by dichroic filter 34 and is focused by a field lens 54. The red color component then passes through polarizer 56, which is oriented to transmit S-polarized light. The polarizer 56 improves contrast by eliminating P-polarized light that might otherwise leak through to LCD panel 14. The red color component then enters polarizing beamsplitter 58 which reflects the S-polarized light into the red LCD panel 14. The modulated LCD panel 14 generates a red image. The reflected red image (in the P-polarization state) passes through the beamsplitter 58 and into the crossed dichroic prism 42.

The three color components reflected from the three LCD panels 14, 16, and 18 pass through their respective polarizing beamsplitters and into the crossed dichroic prism 42, which combines the reflected images. The projection lens 62 then projects the converged images from all three LCD panels onto a projection screen (not shown).

Figure 1A:
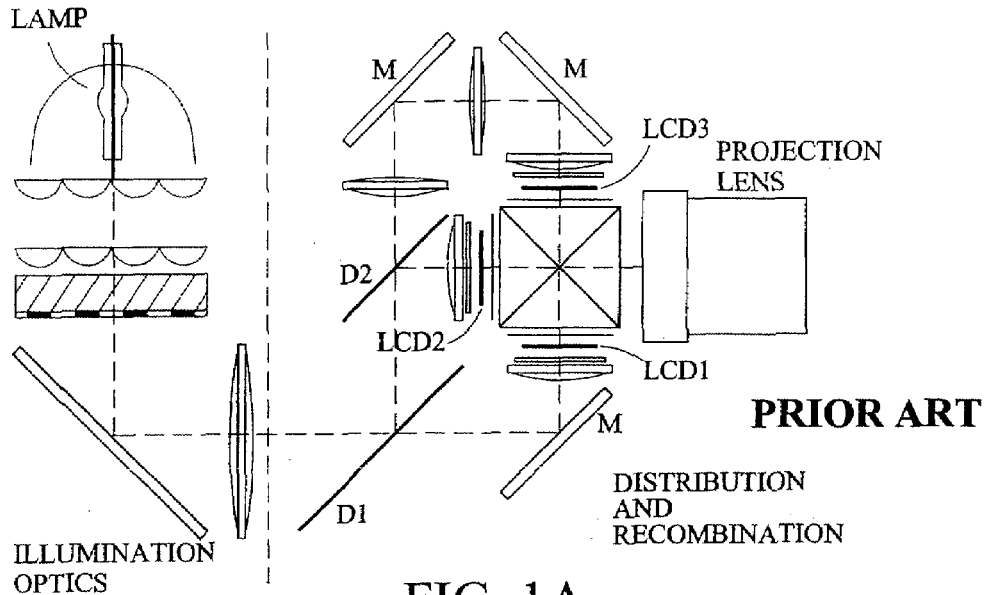
FIG. 1A is a schematic diagram of a prior art transmissive LCD projector.
Figure 1B:
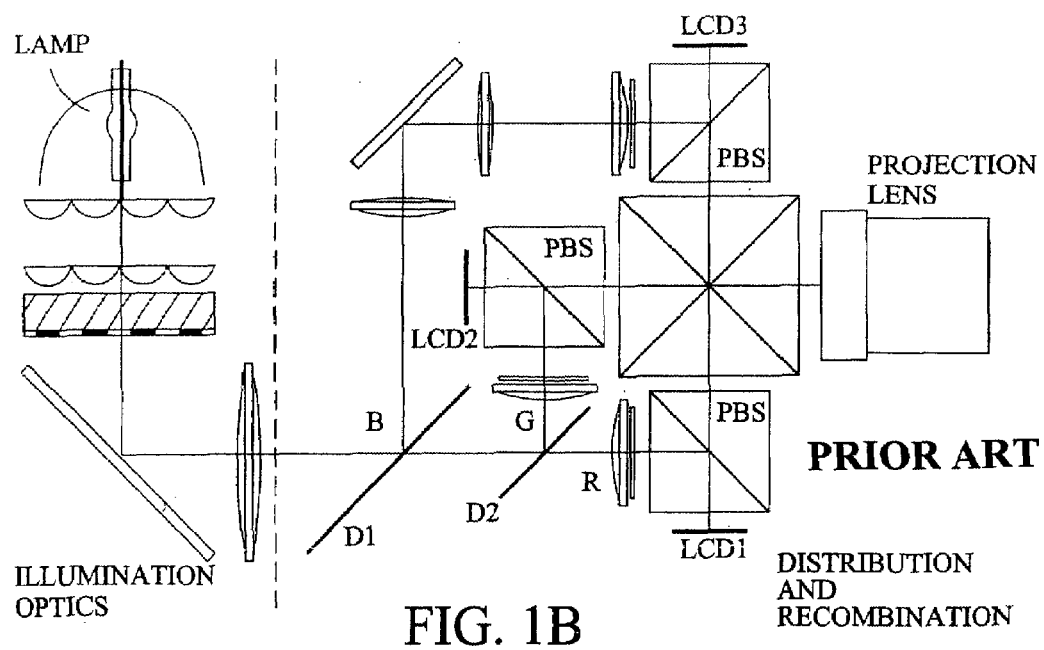
FIG. 1B is a schematic diagram of a prior art reflective LCD projector.
Figure 2:
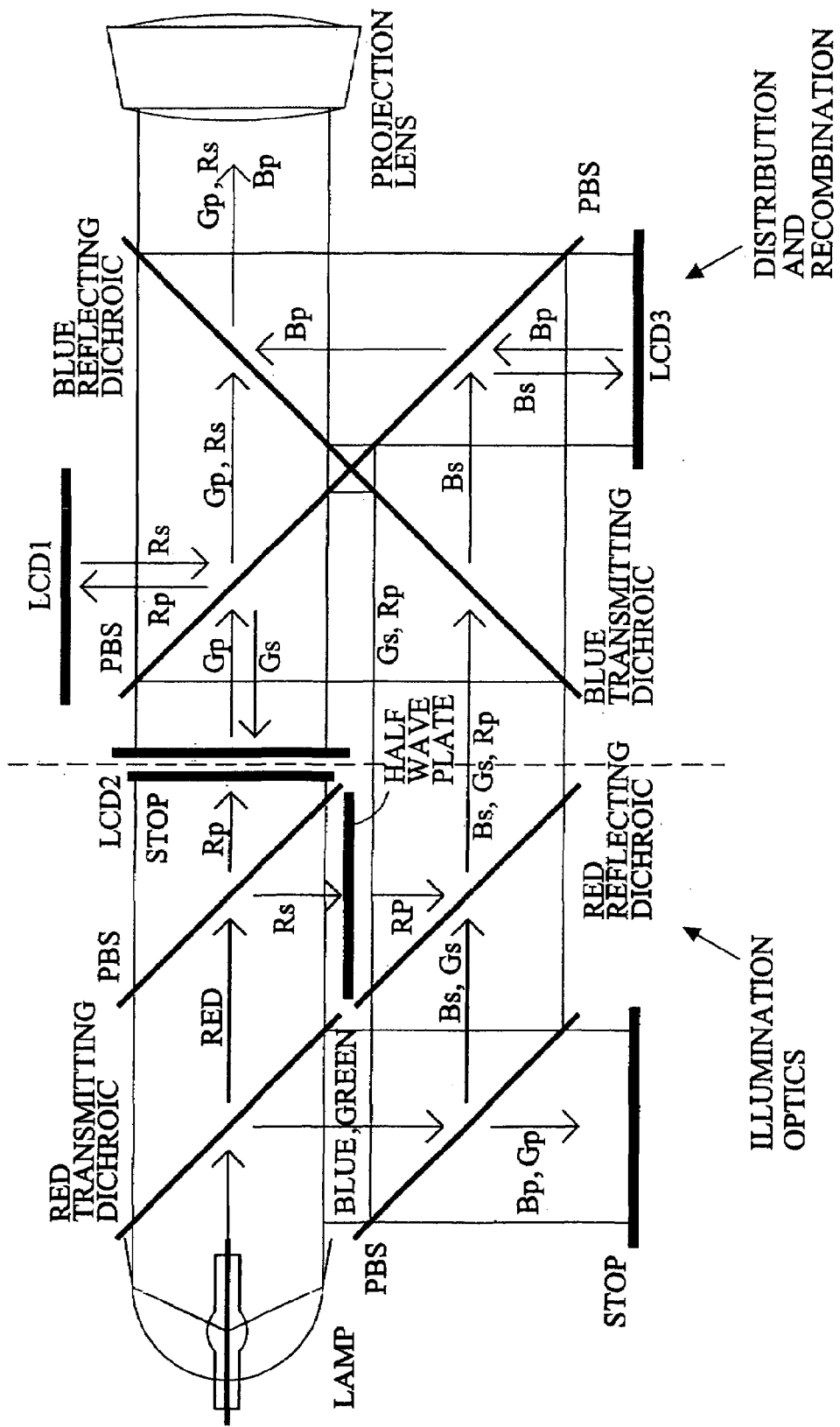
FIG. 2 is a schematic diagram of a projection display system that utilizes a prefiltering system.

The projection system of FIG. 3 retains the configuration of polarizing beamsplitters and crossed dichroic prism of the conventional reflective LCD projector shown in FIG. 1B. However, this projector significantly reduces the size of the optics required to distribute the illumination light into the three color channels. The key to this reduction is the use of the color component rotator 40, in this case a blue color component rotator, which allows the single polarizing beamsplitter 41 to perform the dual function of separating the green and blue color components and also to control the operation of green LCD panel 16. Thus, the system 10 has significantly reduced the size and complexity of the optics required.

Figure 4A:
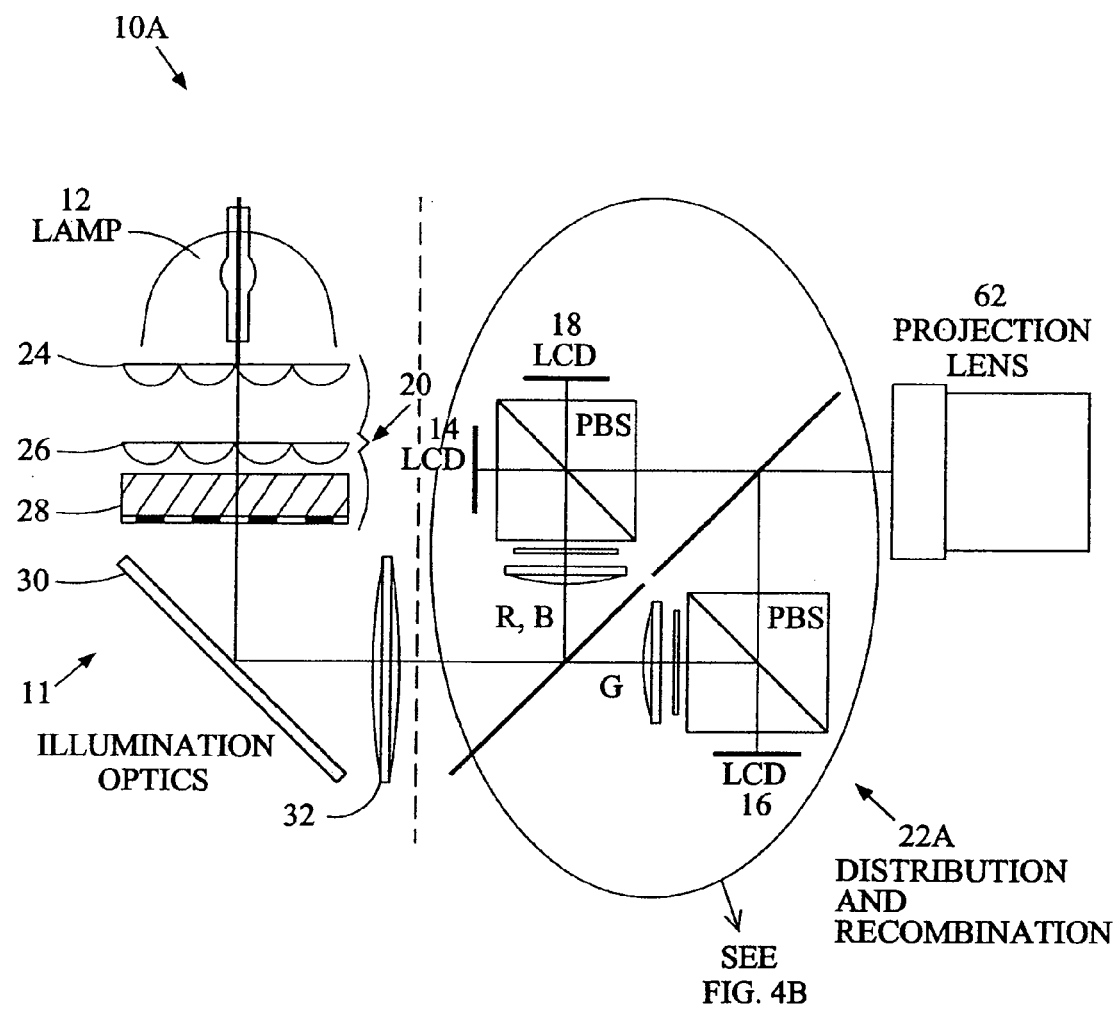
FIG. 4A is a second embodiment of a projection display system of the present invention.
Figure 4B:
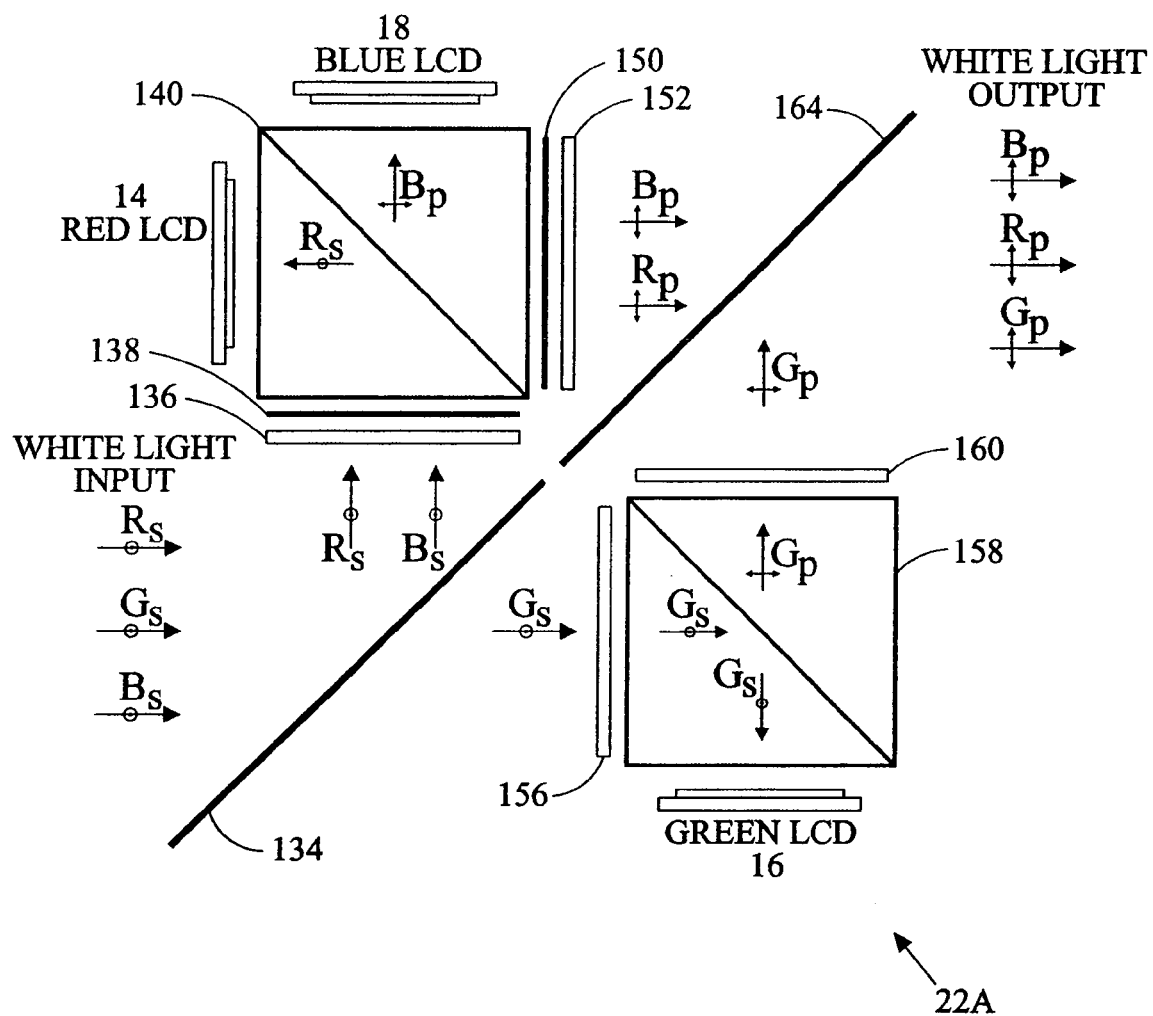
FIG. 4B is a detail view of the distribution and recombination portion of the display of FIG. 4A.

An alternative projection display system 10A is shown in FIGS. 4A and 4B. Like system 10 shown in FIG. 3, system 10A shown in FIG. 4A has a light source 12, red LCD panel 14, green LCD panel 16, and blue LCD panel 18. The system 10A utilizes the same illumination portion 11. A polarization converter 20 comprised of fly's-eye lens plates 24, 26 and prism array 28 provide light consisting of all three color components polarized in the S direction. Mirror 30 reflects light through lens 32 into the distribution and recombination portion 22A of the system.

Referring now to the distribution and recombination portion 22A shown in more detail in FIG. 4B, dichroic filter 134 separates the white light by transmitting the green color component while reflecting the red and blue color components. Referring to the green channel, the green color component passes through polarizer 156 which transmits light polarized in the S direction. The green color component then enters polarizing beamsplitter 158 which reflects the S-polarized light onto the green LCD panel 16. The reflected image (now in the P-polarization state) passes through the beamsplitter 158 and through analyzer 160, which transmits light in the P-polarization state. Analyzer 160 improves contrast by eliminating S-polarized light that has leaked through the green channel. The green color component is then reflected by dichroic filter 164, and then transmitted through projection lens 62.

Turning to the red and blue channels, the red and blue color components are reflected by dichroic filter 134 and passed through polarizer 136, which transmits only S-polarized light. The red and blue color components then pass through a selective color component rotator 138, that acts as a half waveplate for the blue color component. Thus, the blue color component is rotated from the S-polarization state to the P-polarization state, while the red color component remains unaffected. Thus, the two color components (red and blue) entering the polarizing beamsplitter 140 have different polarization states (e.g. S and P respectively). The polarizing beamsplitter 140 reflects the red color component and transmits the blue color component. The polarizing beamsplitter 140 reflects the S-polarized red color component onto the modulated red LCD panel 14, which generates a red image now in the P-polarization state. Similarly, the blue color component transmitted by the polarizing beamsplitter 140 is reflected off the modulated blue LCD panel 18, which generates a blue image in the S-polarization state. The red image reflected by LCD panel 14 is transmitted through polarizing beamsplitter 140 while the blue image reflected by LCD panel 18 is reflected by the polarizing beamsplitter 140. Both the red and blue color components pass through another selective color component rotator 150, which selectively rotates the blue color component from the S to the P-polarization state, so that the two color components again have the same polarization state. The red and blue color components then pass through an analyzer 152 which transmits only light that is P-polarized. The blue and red color components then pass through dichroic filter 164, where they are combined with the green color component and projected through projection lens 62.

The analyzer 152 and the second selective color component rotator 150 are introduced to control a practical implementation problem that arises due to the non-ideal operation of the polarizing beamsplitter 140. Ideally, a polarizing beamsplitter will reflect all S-polarized light that enters and transmit all P-polarized light. However, a typical practical polarizing beamsplitter has extremely high reflectivity for S-polarized light with virtually no S-polarized light transmitted. The transmitted light is therefore a highly pure, P-polarized distribution. However, the practical polarizing beamsplitter also reflects a small portion of the P-polarized light, sometimes as much as 10 percent, giving a reflected distribution that is a mixture of predominantly S-polarized light and a small portion of P-polarized light.

Turning now to the projection display system shown in FIG. 4B, the selective color component rotator 138 rotates the blue color component from the S to P-polarization state, leaving the red color component S-polarized. The light transmitted through polarizing beamsplitter 140 will be just the blue color component with the P-polarization, but the reflected light will be the S-polarized red color component and a small portion of the P-polarized blue color component. Accordingly, a portion of the blue color component leaks into the red channel and illuminates the red LCD panel 14. If the blue color component reflects off the red LCD panel 14 without modulation, it will re-enter polarizing beamsplitter 140 as P-polarized light and transmit through the polarizing beamsplitter 140, through the dichroic filter 164, and through the projection lens 62. This undesired light will significantly reduce the contrast in the blue color component.

However, by introducing the second selective color component rotator 150, also designed like the color component rotator 138 to be a half waveplate for the blue color component, the unwanted P-polarized blue color component from the red channel will be rotated to be S-polarized. The desired output blue color component from the blue channel will reflect out of the polarizing beamsplitter 140, as S-polarized and will be rotated to the P-polarization state by the selective color component rotator 150. The blue output distribution then has the same P-polarized orientation as the desired red output distribution. The analyzer 152, oriented in the P direction, transmits the desired red and blue color components in the P-polarization state, but absorbs and eliminates the unwanted blue color component in the P-polarization state that leaked into the red channel and reflected off the red LCD panel 14 through polarizing beamsplitter 140. Some portion of the blue color component that leaks into the red channel may be modulated by the red LCD panel 14 and re-enter the polarizing beamsplitter 140 as S-polarized light. If this occurs, the polarizing beamsplitter 140 has strong S-polarized reflection and virtually no S-polarized transmittance. The modulated portion of the blue leakage color component will then be reflected back toward the illumination optics and will not pass through to the projection lens. This particular configuration of using two selective color component rotators 138, 150 and an analyzer 152 is essential to enable the high contrast operation of two LCD panels with a single PBS prism.

Figure 5:
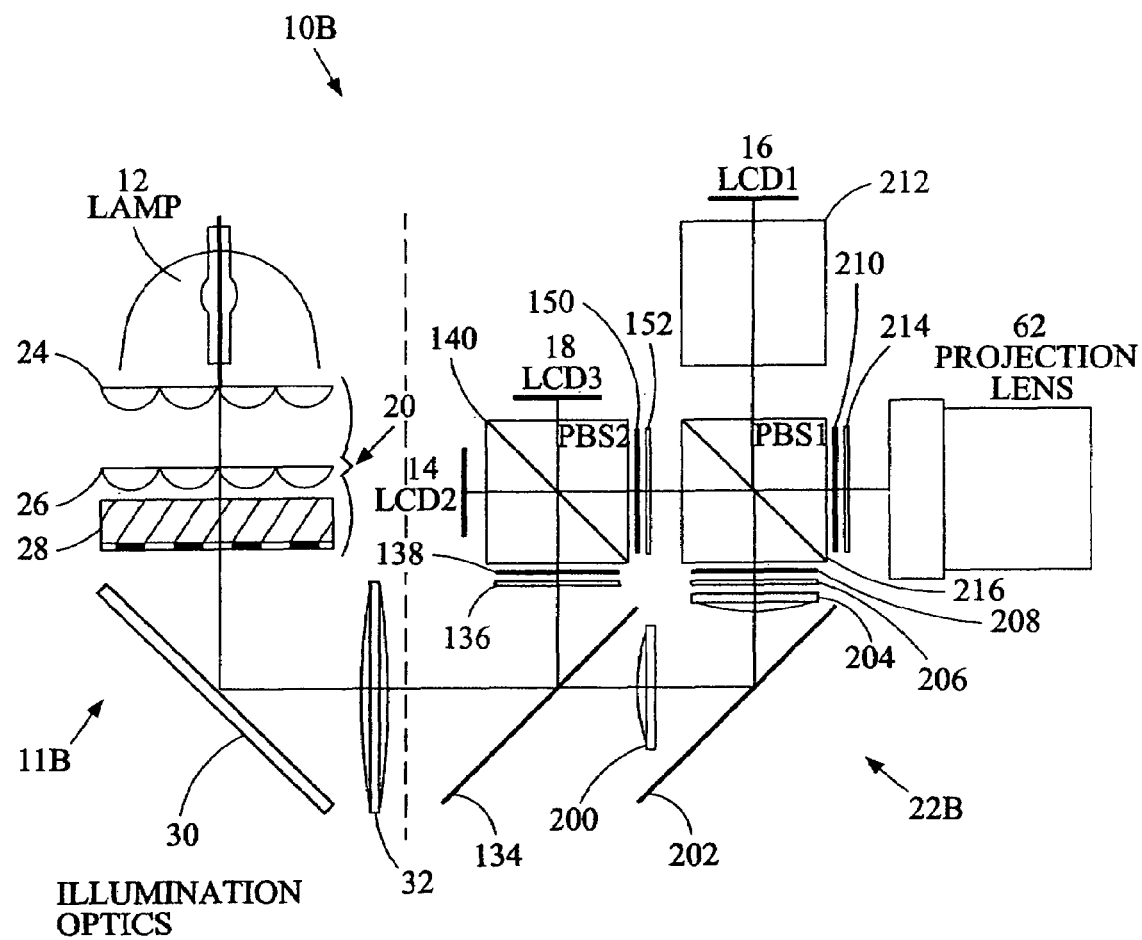
FIG. 5 is a third embodiment of a projection display system of the present invention.

Another alternative projection display system is shown in FIG. 5. The system again begins with a conventional illumination system as described previously for the embodiments of FIGS. 3 and 4A and 4B. The input color components, all S-polarized, enter the color distribution and recombination portion 22B of the system 10B. A green transmitting dichroic filter 134 reflects the blue and red color components up to the polarizing beamsplitter 140. The polarizer 136 and analyzer 152, the selective color component rotators 138 and 150, and the polarizing beamsplitter 140 control the operation of splitting and recombining the red and blue color components in exactly the same fashion as in the system 10A of FIGS. 4A and 4B.

The alternative arrangement is contained within the green channel. The S-polarized green color component is passed through lens 200 and is reflected by mirror 202. The green color component then is passed through lens 204 and polarizer 206. The polarizer 206 removes any residual P-polarized light. The green color component then passes through a selective color component rotator 208, which is designed and oriented to rotate green light polarization by 90 degrees, so as to rotate the green color component to the P-polarization state. The green color component passes through polarizing beamsplitter 216 to the green LCD panel 16. The relay lenses 200 and 204 are used to compensate for the longer path length of the green channel relative to the red or blue channels. A block of glass 212 is introduced to provide the same optical path length for the green channel as the red and blue channels between the LCD panels and the projection lens. The modulated LCD panel 16 generates a green image, which is reflected in the S-polarization state. The green image reflects off the polarizing beamsplitter 216 and into a color component rotator 210. This color component rotator 210 selectively rotates the polarization of the green color component from the S to the P state. The analyzer 214 eliminates any green light that might have been reflected into the red or blue channel from polarizing beamsplitter 216 and maintains high contrast performance for the green channel.

While exemplary projection displays have been described, other projection display configurations that utilize LCD panels (either reflective, transmissive, or a combination thereof) and polarizing devices such as polarization converters may find utility with the present invention. Moreover, other color components, wavelength ranges, and polarization states may be used as desired.

Figure 6:
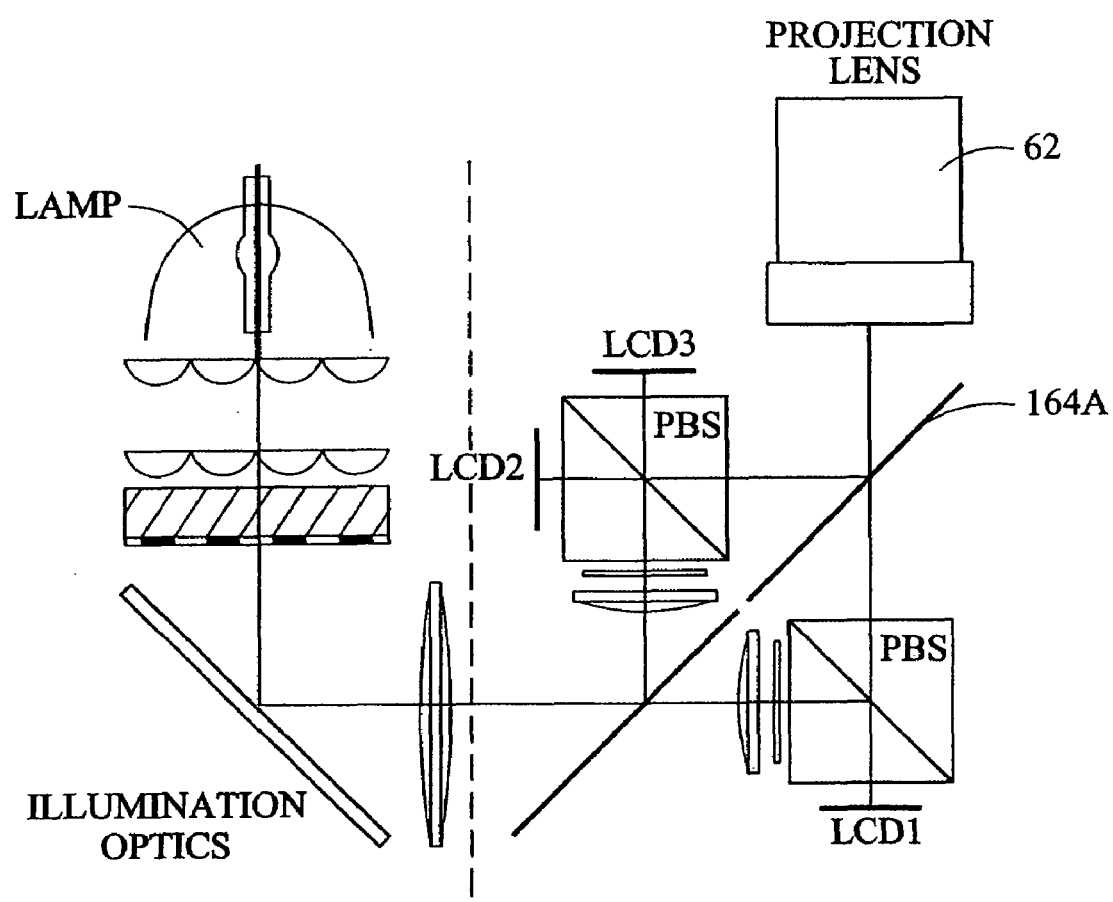
FIG. 6 is a fourth embodiment of a projection display system of the present invention.

Other alternative system architectures are also possible. In the system shown in FIG. 4B, dichroic filter 134 may instead transmit the red or blue color component. Alternatively, the output dichroic filter 164 could be changed to a green transmitting filter 164A, rather than a green reflecting filter. The resulting system configuration is shown in FIG. 6. The projection lens 62 is moved to capture the output and send the projected image up, rather than to the right, and may be considered for overall system packaging considerations.

With respect to the embodiment shown in FIG. 3, it may be possible to switch the red reflecting dichroic in the crossed dichroic prism 42 to a green reflecting dichroic. Then, by changing the input dichroic filter 34 to a green transmitting filter, the LCD panels 14 and 16 may be substituted for each other, so that the green color component would enter from the bottom as shown in FIG. 3 while the red color component would enter the crossed dichroic prism 42 from the left as shown in FIG. 3.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for displaying an image, comprising:
   (a) providing light comprised of a first color component, a second color component, and a third color component;
   (b) converting said light to a single polarization state;
   (c) separating said first color component from said second and third color components while said first, second, and third color components are in the same beam;
   (d) mismatching said polarization states of said second and third color components relative to each other while said second and third color components are within the same beam;
   (e) separating said second color component from said third color component while said second and third color components are within the same beam;
   (f) generating respective images from each of said first, second, and third color components separated from one another into different beams; and
   (g) projecting said images,
   wherein said polarization states of said second and third color components are matched again before generating said image from said second color component.

2. The method of claim 1 wherein said first color component is separated from said second and third color component using a dichroic filter.

3. The method of claim 2 wherein said second color component is separated from said third color component using a polarizing beamsplitter.

4. The method of claim 1 wherein said polarization state of said second color component is changed using a color component rotator.

5. The method of claim 1 wherein said first, second and third color components are reflected onto respective liquid crystal display panels to generate said images.

6. A method for displaying an image, comprising:
   (a) providing light comprised of a first color component, a second color component, and a third color component;
   (b) converting said light to a single polarization state;
   (c) separating said first color component from said second and third color components while said first, second, and third color components are in the same beam;
   (d) mismatching said polarization states of said second and third color components relative to each other while said second and third color components are within the same beam;
   (e) separating said second color component from said third color component while said second and third color components are within the same beam;
   (f) generating respective images from each of said first, second, and third color components separated from one another into different beams
   (g) combining each of said first, second, and third generated image within the same beam, wherein each of said first, second, and third generated image within the same beam shares a common polarization state relative to each other;
   (h) projecting said images; and
   (i) said first generated image is free from being directed through a color component rotator.

* * * * *